United States Patent
Wagner et al.

(10) Patent No.: US 9,894,081 B2
(45) Date of Patent: Feb. 13, 2018

(54) METHOD AND DEVICE FOR AVOIDING MANIPULATION OF A DATA TRANSMISSION

(71) Applicant: Robert Bosch GmbH, Stuttgart (DE)

(72) Inventors: Dirk Wagner, Pfinztal (DE); Andreas Soenkens, Remseck Am Neckar (DE); Frank Ahnert, Ludwigsburg (DE); Juergen Schramm, Bietigheim-Bissingen (DE); Thomas Hartgen, Ludwigsburg (DE); Werner Stadler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/491,663

(22) Filed: Apr. 19, 2017

(65) Prior Publication Data
US 2017/0310684 A1    Oct. 26, 2017

(30) Foreign Application Priority Data
Apr. 20, 2016 (DE) .......... 10 2016 206 630

(51) Int. Cl.
*G06F 7/04* (2006.01)
*H04L 29/06* (2006.01)

(52) U.S. Cl.
CPC ........ *H04L 63/123* (2013.01); *H04L 63/1466* (2013.01)

(58) Field of Classification Search
CPC ........ H04L 63/08; H04L 9/3281; H04L 9/32; G06F 21/10
See application file for complete search history.

(56) References Cited

U.S. PATENT DOCUMENTS

| | | | | |
|---|---|---|---|---|
| 9,729,535 | B2* | 8/2017 | Lee | .......... H04L 63/08 |
| 2015/0270968 | A1* | 9/2015 | Nairn | .......... H04L 9/32 713/181 |
| 2016/0255065 | A1* | 9/2016 | Oshida | .......... H04L 61/6022 726/3 |
| 2017/0099201 | A1* | 4/2017 | Segawa | .......... H04L 43/08 |
| 2017/0195878 | A1* | 7/2017 | Takemori | .......... H04W 12/04 |

FOREIGN PATENT DOCUMENTS

DE    102009002396 A1    10/2010

OTHER PUBLICATIONS

International Standard, "ISO 26262-4 Road vehicles—Functional safety Part 4: Product development at the system level" Switzerland, Nov. 15, 2011.

* cited by examiner

*Primary Examiner* — Ali Abyaneh
(74) *Attorney, Agent, or Firm* — Norton Rose Fulbright US LLP; Gerard Messina

(57) ABSTRACT

A method and device for avoiding manipulation of a data transmission. A message containing a message authentication code is received at a processing unit, the message from the processing unit is transferred to a hardware module, a check value as a function of the received message is computed in the hardware module, the received message authentication code and the check value are compared in the hardware module, a result of the comparison is transferred from the hardware module to the processing unit as an output variable, the message authentication code received in the message from the processing unit is checked in the processing unit based on the output variable.

5 Claims, 3 Drawing Sheets

METHOD AND DEVICE FOR AVOIDING MANIPULATION OF A DATA TRANSMISSION

CROSS REFERENCE

The present application claims the benefit under 35 U.S.C. §119 of German Patent Application No. DE 102016206630.7 filed on Apr. 20, 2016, which is expressly incorporated herein by reference in its entirety.

FIELD

The present invention relates to a method and a device for avoiding manipulation of a data transmission.

BACKGROUND INFORMATION

German Patent Application No. DE 10 2009 002 396 A1 describes a method for protecting data transmissions in a vehicle from manipulation with the aid of message authentication code.

Messages which are transmitted in vehicles, for example, via a controller area network or FlexRay databus, are provided with a checksum, for example, for a cyclic redundancy check. Safety-critical messages are checked on the receiver side using this checksum.

The checksum may also be supplemented or replaced by the message authentication code.

The check is carried out with the aid of software and/or hardware specifically adapted for this purpose.

To prevent manipulations, the software and/or hardware may be developed according to the so-called principle of least privilege. Accordingly, each module, i.e., each processor or each program within the overall system only has access to the information or resource which is necessary for fulfilling the particular purpose.

If a special hardware module is used for checking the message authentication code, the principle of least privilege may be violated in that the special hardware module may also be used for generating a message authentication code. This makes it possible for a compromised recipient of a message to also send a falsified message having a valid message authentication code in the name of the original sender.

SUMMARY

The present invention provides a method and a device for protecting data transmissions from manipulation.

This satisfies the principle of least privilege on the recipient side. An error response in the case of a failed security check in the special hardware module is superfluous. The use of a hardware qualified according to the Automotive Safety Integrity Level is not necessary to avoid manipulation of the data transmission.

Further advantages ensue from the following description as well as the figures.

Exemplary embodiments of the present invention are depicted in the figures and explained in the following description.

DETAILED DESCRIPTION OF EXAMPLE EMBODIMENTS

A first part 110 of the method is implemented with the aid of software which is executed, for example, with the aid of a processing unit. In the following, this processing unit is also denoted as central processing unit CPU.

A second part 120 of the method is implemented with the aid of a special hardware module. In the following, this hardware module is also denoted as HSM.

Figure 1:
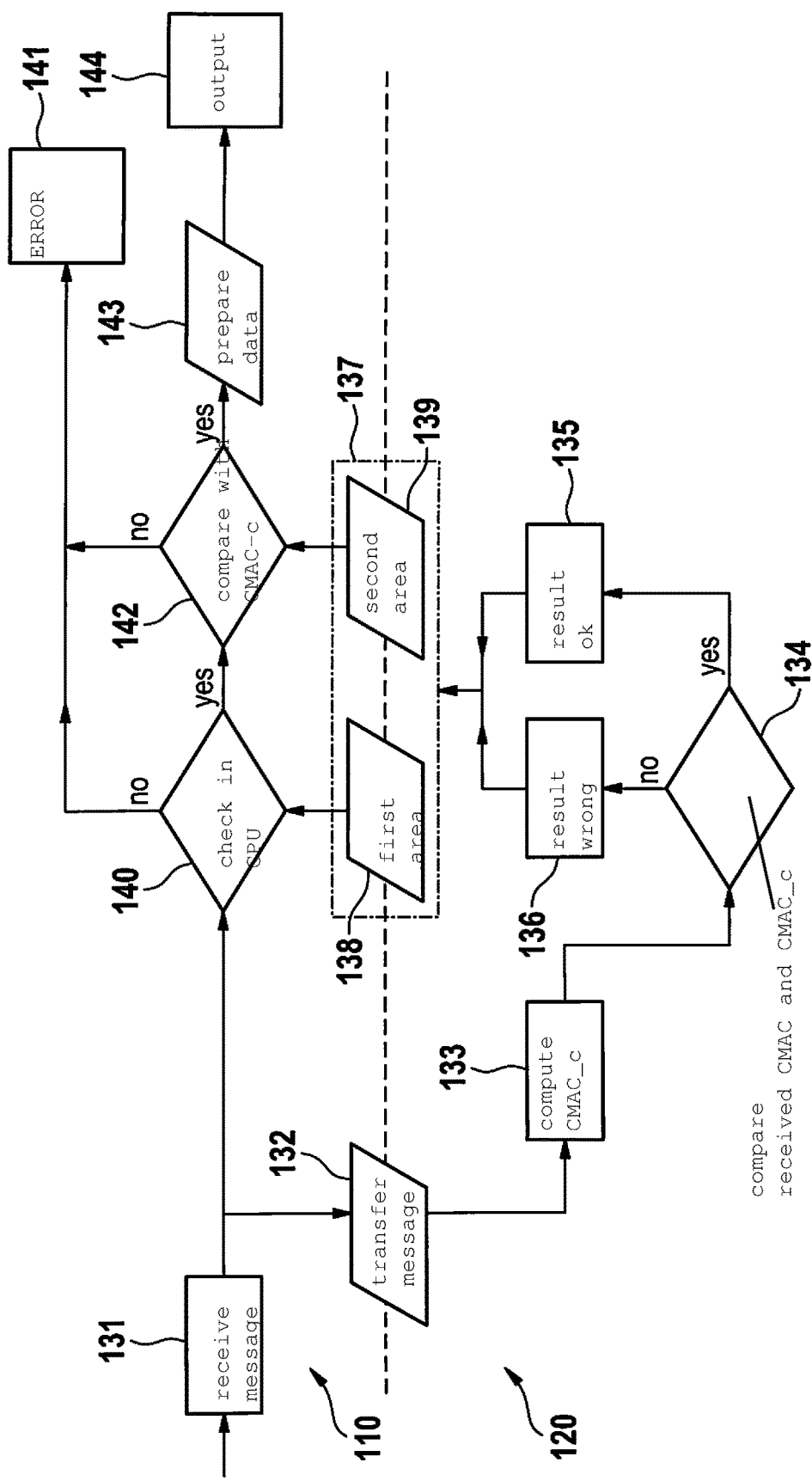
FIG. 1 schematically shows a method for processing a received message.

The boundary between the two parts is represented by a dashed line in FIG. 1.

In the example, a message authentication code, in particular a cipher-based message authentication code, known as CMAC, is used as a special form of a message authentication code, known as MAC. With regard to the implementation of CMAC, particular reference is made to NIST Special Publication 800-388. In principle, the method may be used for all MAC variants.

The method includes the following steps for processing the message.

In step 131, a message is received from the CPU. The message includes a CMAC. The message includes, for example, a safety-critical signal.

Subsequently, a step 132 is carried out.

In step 132, the message is transferred from the CPU to the HSM.

In the example, an interface, in particular a databus, is provided for the data transmission between the CPU and the HSM.

Subsequently, a step 133 is carried out.

In step 133, a check-CMAC, in particular a value CMAC_c, is computed in the HSM.

Subsequently, a step 134 is carried out.

In step 134, the received CMAC and the check-CMAC are compared in the HSM. In particular, the CMAC contained in the message is compared with the value CMAC_c.

If they match, a step 135 is carried out. Otherwise, a step 136.

In step 135, the value of an output variable is set to a value that signals that the received CMAC and the check-CMAC match. For example, a result variable is set to the value OK.

Subsequently, a step 137 is carried out.

In step 136, the value of an output variable is set to a value that signals that the received CMAC and the check-CMAC do not match. For example, a result variable is set to the value WRONG.

Subsequently, step 137 is carried out.

In step 137, the result of the check and check-CMAC is transferred to the CPU. In particular the value CMAC_c and the result variable are transferred to the CPU. For that purpose, an interface, in particular a databus, is provided for the data transmission between the HSM and the CPU.

As shown in FIG. 1, the interface may include a first area 138 for the result variable and a second area 139 for the value CMAC_c.

Subsequently, a step 140 is carried out.

In step 140, the result of the check that was carried out by the HSM is checked in the CPU. If the check in the HSM showed that the received CMAC did not match the check-CMAC, a step 141 is carried out.

Otherwise, a step 142 is carried out.

In step 141, an error response is triggered. For example, an error entry "ERROR" is written to an error memory.

Subsequently, the method ends.

In step 142, the CMAC received in the message from the CPU is compared with the check-CMAC, which was transferred by the HSM. For example, the CMAC from the message is compared with the value CMAC_c.

A test of a freshness counter may be provided to ensure that the message whose CMAC is compared with the value CMAC_c is to be compared at this point in time.

Subsequently, a step 143 is carried out.

In step 143, the data from the message are prepared for further use. For example, the data are extracted from the message.

Subsequently, a step 144 is carried out.

In step 144, the data are output by the CPU. Alternatively, the data may also be used in another program component which runs on the CPU. For example, the data are stored in an output memory.

Subsequently, the method ends.

Alternatively or in addition, the message, in particular the data received with the message, may also be used after an error response was triggered in step 141.

Some of the steps are implemented in the example in such a way that a predefined Automotive Safety Integrity Level is satisfied. For that purpose, the implementation is used according to a version of Standard ISO 26262, Automotive Safety Integrity Level, which is known at the point in time of the application.

For other steps, this standard is not used in the example. These steps may satisfy other quality requirements in the example. In the example, steps 131, 140, 141, 142, 143 and 144 must be implemented according to the predefined Automotive Safety Integrity Level in order to avoid a manipulation in the best possible way. If the requirement is appropriately low, the possibility also exists of not implementing all of the named steps accordingly.

In step 137, the check-CMAC computed in step 133 is preferably transferred to the CPU only if step 134 was successful. Otherwise, an invalid check-CMAC, for example, the value 0, is advantageously transferred to the CPU.

This satisfies the principle of least privilege in that the check-CMAC leaves the HSM only if a message having a matching CMAC was previously transferred in step 132.

Figure 2:
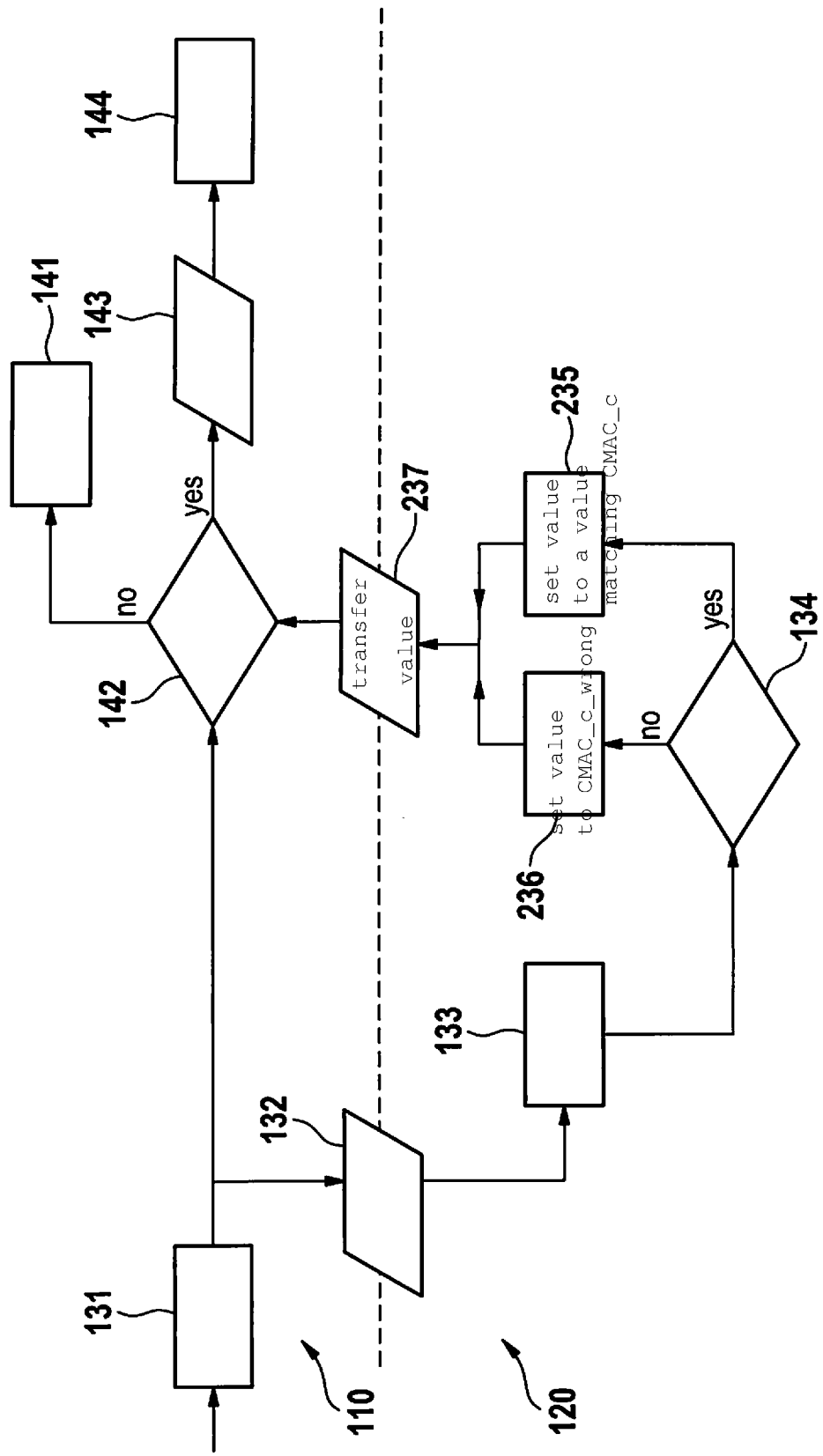
FIG. 2 schematically shows another method for processing a received message.

FIG. 2 shows another method of processing. Steps having the same sequence as in the method described above with reference to FIG. 1 are denoted by the same reference numerals in FIG. 2. These are not explained again in the following.

Instead of step 135, a step 235 is now carried out.
Instead of step 136, a step 236 is now carried out.
Instead of step 137, a step 237 is now carried out.

In step 235, the value of the output variable is set to a value that matches the check-CMAC.

For example, the result variable is set to the value of the check-CMAC, in particular the value CMAC_c, which was computed by the HSM.

In step 236, the value of an output variable is set to a value which by format is consistent with a possible CMAC but does not match either the CMAC of the received message or the check-CMAC computed by the HSM, in particular does not match value CMAC_c.

For example, a value of CMAC_c_wrong is used.

In step 237, the result of the check, for example, a check value is transferred to the CPU. In particular, the value CMAC_c or CMAC_c_wrong is transferred to the CPU.

This means that step 237 was optimized to the extent that only a return value is transferred to the CPU using CMAC_c or CMAC_c_wrong. Depending on the result of the check in step 134, this corresponds either to the computed check-CMAC from step 133 or to an incorrect CMAC, i.e., CMAC_c_wrong.

Thus, as compared with the method previously shown, on the one hand, first area 138 on the interface is omitted. On the other hand, step 140, i.e., the check of the result variable, is omitted. A failed check is thus also detected and triggers the appropriate error response.

For example, the following strategy is used in steps 235, 236, 237 for determining CMAC_c or CMAC_c_wrong.

If the test is successful, the test-CMAC, in particular CMAC_c, is transferred to the CPU.

If the test is not successful, an incorrect CMAC, in particular a value CMAC_c_wrong, is computed and transferred to the CPU.

At the same time, the following conditions apply:

(B1) CMAC_c_wrong is different from the CMAC in the received message (B2) CMAC_c_wrong is different from the check-CMAC First condition B1 is a functional safety requirement for ensuring that the check in step 142 will be unsuccessful.

Second condition B2 is an information security requirement for satisfying the principle of least privilege.

The computation method for CMAC_c_wrong is selected in such a way that both conditions B1 and B2 are satisfied and, in particular, no inferences can be made concerning the check-CMAC, in particular the value CMAC_c.

The message to be sent may also be provided with the freshness counter to ensure the timeliness of the data from the point of view of the functional safety (for example, data frame freeze resulting from defective HW) and from the point of view of information security (replay attack).

The present invention is used, for example, in protected bus communication of messages including safety-relevant contents.

Figure 3:
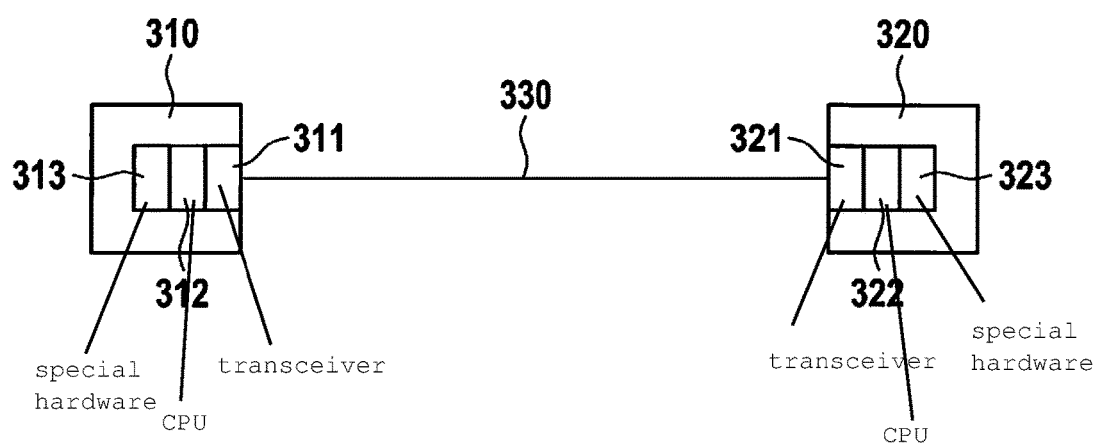
FIG. 3 schematically shows a device for data transmission.

FIG. 3 shows a device including an engine control unit 310 and a brake control unit 320 which are able to communicate via a method of the type described above. Engine control unit 310 includes a first transceiver 311, a first CPU 312 and a first special hardware 313. Brake control unit 320 includes a second transceiver 321, a second CPU 322, and a second special hardware 323. Transceivers 311, 321, and CPU 312, 322 are designed for communication with the aid of one of the described methods. First part 110 of the method is implemented, for example, with the aid of software, which is executed in particular CPU 312, 322.

Second part 120 of the method is implemented, for example, with the aid of the special hardware module in particular special hardware 313, 323. The HSM is preferably a hardware module. This hardware module contains or uses, for example, one or multiple hardware peripheral devices to perform the functions described above.

The hardware module may also be designed at least partially as a processor, which executes software for displaying the particular function.

For example, a random number generator may be implemented in the hardware of the hardware module or as peripheral hardware of the hardware module. The random number generator may, for example, be implemented by an additional processor on which software is executed.

The steps in the hardware module, in particular steps 133, 134, 135, 136, 235, 236, could also be carried out in software.

What is claimed is:

1. A method far avoiding manipulation of a data transmission, comprising:
   receiving, at a processing unit, a message containing a message authentication code;
   transferring the message from the processing unit to a hardware module;
   computing, in the hardware module, a check value as a function of the received message;
   comparing, in the hardware module, the received message authentication code and the check value;
   transferring a value that indicates a result of the comparison and the check value from the hardware module to the processing unit;
   checking, in the processing unit, the value that indicates the result of the comparison; and
   checking, in the processing unit, the message authentication code received in the message at the processing unit based on the check value.

2. The method as recited in claim 1, wherein the value of the result of the comparison is set to a value that signals that the received message authentication code and the check value match.

3. The method as recited in claim 1, wherein the message authentication code is a cipher-based message authentication code.

4. A device for avoiding manipulation of a data transmission, the device comprising:
   a processing unit; and
   a hardware module;
the device designed to:
   receive, at the processing unit, a message containing a message authentication code;
   transfer the message from the processing unit to the hardware module;
   compute, in the hardware module, a check value as a function of the received message;
   compare, in the hardware module, the received message authentication code and the check value;
   transfer a value that indicates a result of the comparison and the check value from the hardware module to the processing unit;
   check, in the processing unit, the value that indicates the result of the comparison; and
   check, in the processing unit, the message authentication code received in the message at the processing unit based on the check value.

5. A non-transitory computer readable storage medium on which is stored a computer program for avoiding manipulation of a data transmission, the computer program, when executed by a processor, causing the processor to perform:
   receiving, at a processing unit, a message containing a message authentication code;
   transferring the message from the processing unit to a hardware module;
   computing, in the hardware module, a check value as a function of the received message;
   comparing, in the hardware module, the received message authentication code and the check value;
   transferring a value that indicates a result of the comparison and the check value from the hardware module to the processing unit;
   checking, in the processing unit, the value that indicates the result of the comparison; and
   checking, in the processing unit, the message authentication code received in the message at the processing unit based on the check value.

* * * * *